US009669720B2

(12) United States Patent
Higashi et al.

(10) Patent No.: US 9,669,720 B2
(45) Date of Patent: Jun. 6, 2017

(54) MANAGING THE EXCHANGE OF ELECTRICAL POWER WITH RECHARGEABLE VEHICLE BATTERIES IN V2X SYSTEMS (71) Applicant: Nissan North America, Inc., Franklin, TN (US)

(72) Inventors: Kazuyuki Higashi, Farmington Hills, MI (US); Yukinari Kato, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 187 days.

(21) Appl. No.: 14/670,847

(22) Filed: Mar. 27, 2015

(65) Prior Publication Data
US 2016/0280090 A1 Sep. 29, 2016

(51) Int. Cl.
*H01M 10/44* (2006.01)
*H01M 10/46* (2006.01)
*B60L 11/18* (2006.01)
*H02J 3/28* (2006.01)

(52) U.S. Cl.
CPC ......... *B60L 11/1842* (2013.01); *B60L 11/184* (2013.01); *B60L 11/1816* (2013.01); *H02J 3/28* (2013.01)

(58) Field of Classification Search
CPC ....... H02J 7/0021; H02J 7/0026; H02J 7/0027
USPC ....... 320/104, 107, 109, 132, 134, 136, 125, 320/160; 307/43, 66
See application file for complete search history.

(56) References Cited

U.S. PATENT DOCUMENTS

| 7,783,390 | B2 | 8/2010 | Miller |
| 8,581,545 | B2 | 11/2013 | Obayashi et al. |
| 8,872,379 | B2 | 10/2014 | Ruiz et al. |
| 9,400,990 | B2 | 7/2016 | Genschel et al. |
| 2009/0040029 | A1* | 2/2009 | Bridges .................. G06Q 50/06 340/12.37 |
| 2011/0082598 | A1 | 4/2011 | Boretto et al. |
| 2011/0204720 | A1* | 8/2011 | Ruiz .................. B60L 11/1816 307/66 |

(Continued)

FOREIGN PATENT DOCUMENTS

JP  11089243 A  3/1999

OTHER PUBLICATIONS

U.S. Appl. No. 14/025,872, filed Sep. 13, 2013.
U.S. Appl. No. 14/220,646, filed Mar. 20, 2014.

*Primary Examiner* — Edward Tso
(74) *Attorney, Agent, or Firm* — Young Basile Hanlon & MacFarlane, P.C.

(57) ABSTRACT

A V2X system includes an electrical power distribution system configured to draw electrical power from a grid, support the supply of the drawn electrical power to one or more primary electrical systems and support the exchange of electrical power with a battery bank including at least one rechargeable vehicle battery. A controller manages the exchange of electrical power between the electrical power distribution system and the battery bank by identifying a change rate in electrical power drawn by the electrical power distribution system from the grid, selecting an amount of electrical power for the electrical power distribution system to exchange with the battery bank based on the change rate, and signaling for the exchange of the selected amount of electrical power.

16 Claims, 6 Drawing Sheets (56) References Cited

U.S. PATENT DOCUMENTS

2011/0276194 A1  11/2011  Emalfarb et al.
2012/0013299 A1   1/2012  Prosser et al.
2012/0016546 A1   1/2012  Nilssen et al.
2012/0249065 A1  10/2012  Bissonette et al.
2013/0179061 A1   7/2013  Gadh et al.

* cited by examiner

MANAGING THE EXCHANGE OF ELECTRICAL POWER WITH RECHARGEABLE VEHICLE BATTERIES IN V2X SYSTEMS

TECHNICAL FIELD

This disclosure relates to V2X systems that manage a consumer's peak electrical power consumption by selectively exchanging electrical power with rechargeable vehicle batteries.

BACKGROUND

Electrical power is delivered from power generation facilities to consumers by a system of transmission lines and transmission facilities referred to as a grid. Power generation facilities generate electrical power at a near constant rate. Demand for electrical power, however, fluctuates. Generally, a consumer is charged for its consumption of electrical power based not only on the consumer's aggregated total electrical energy consumption, but also on penalties invoked when the consumer's peak electrical power consumption exceeds certain targets.

Electric vehicles that include rechargeable vehicle batteries are becoming common. Electric vehicles, like all vehicles, are typically parked most of the time. Electric vehicles are commonly connected to charging stations that charge their batteries for much if not all of the time they are parked. Vehicle-to-grid/building/home/etc. (V2X) systems take advantage of this in order to manage a consumer's peak electrical power consumption by selectively exchanging electrical power with the batteries. V2X systems not only supply electrical power drawn from the grid to charge the batteries, but also receive electrical power discharged from the batteries to supplement the electrical power drawn from the grid to run other electrical systems. Receiving electrical power discharged from the batteries will not change the consumer's total electrical energy consumption, but may avoid the consumer's peak electrical power consumption exceeding targets.

SUMMARY

Disclosed herein are V2X systems and methods for managing the exchange of electrical power with a battery bank in V2X systems. In one aspect, a V2X system includes an electrical power distribution system configured to draw electrical power from a grid, support the supply of the drawn electrical power to one or more primary electrical systems and support the exchange of electrical power with a battery bank including at least one rechargeable vehicle battery. The V2X system further includes an electrical power distribution system controller for managing the exchange of electrical power between the electrical power distribution system and the battery bank. The controller is configured to identify a change rate in electrical power drawn by the electrical power distribution system from the grid, select an amount of electrical power for the electrical power distribution system to exchange with the battery bank based on the change rate, and signal for the exchange of the selected amount of electrical power.

In another aspect, a method for managing the exchange of electrical power with a battery bank in a V2X system is performed in an electrical power distribution system configured to draw electrical power from a grid, support the supply of the drawn electrical power to one or more primary electrical systems and support the exchange of electrical power with a battery bank including at least one rechargeable vehicle battery. The method includes identifying a change rate in electrical power drawn by the electrical power distribution system from the grid, selecting an amount of electrical power for the electrical power distribution system to exchange with the battery bank based on the change rate, and signaling for the exchange of the selected amount of electrical power.

In yet another aspect, a V2X system includes an electrical power distribution system configured to draw electrical power from a grid, support the supply of the drawn electrical power to one or more primary electrical systems and support the exchange of electrical power with a battery bank including at least one rechargeable vehicle battery. The V2X system further includes an electrical power distribution system controller for managing the exchange of electrical power between the electrical power distribution system and the battery bank. The controller is configured to identify a change rate in electrical power drawn by the electrical power distribution system from the grid. If the electrical power drawn by the electrical power distribution system from the grid is increasing, the controller signals for the discharge of electrical power from the battery bank to the electrical power distribution system. If the electrical power drawn by the electrical power distribution system from the grid is decreasing, the controller signals for the supply of electrical power to the battery bank from the grid via the electrical power distribution system.

These and other aspects will be described in additional detail below.

BRIEF DESCRIPTION OF THE DRAWINGS

The various features, advantages and other uses of the present systems and methods will become more apparent by referring to the following detailed description and drawings in which.

DETAILED DESCRIPTION

Figure 1:
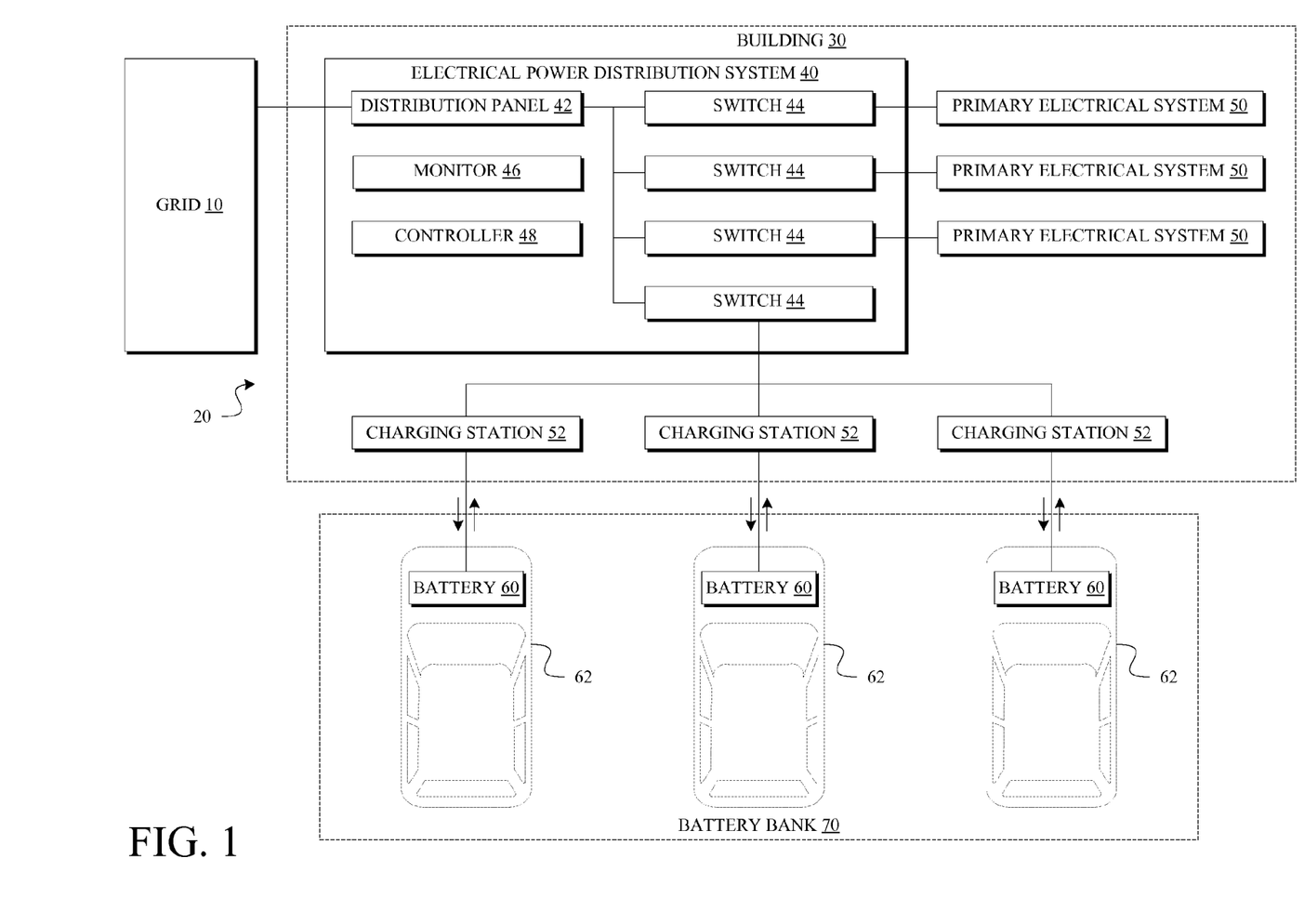
FIG. 1 is a block diagram representing a grid and an example V2X system that is implemented with a building having primary electrical systems and a battery bank including at least one rechargeable vehicle battery, and that includes an electrical power distribution system.

A grid 10 and an example V2X system 20 are represented in FIG. 1. The grid 10 is generally configured to generate, transmit and distribute electrical power. The grid 10 may generally include, for example, one or more electrical power generation facilities, a transmission network that includes long-distance power lines, and a distribution network that receives electrical power from the transmission network and distributes electrical power to consumers.

According to the illustrated example, the V2X system 20 may be implemented with a building 30 (i.e., V2B), for instance. It will be understood that in other examples the V2X system 20 could be implemented with the grid 10 (i.e., V2G), or, with a home (i.e., V2H) or other consumer of electrical power.

The building 30 includes an electrical power distribution system 40 coupling the grid 10 to a variety of electrical systems of the building 30 configured to run on electrical power drawn from the grid 10. The electrical power distribution system 40 may include any suitable equipment for serving these electrical systems, including without limitation a main distribution panel 42 and sub-distribution switches 44, as shown. As further described below, the electrical power distribution system 40 further includes a monitor 46 for measuring the electrical power consumption of the building 30 from the grid 10 and a controller 48.

As shown, the electrical systems of the building 30 may include one or more primary electrical systems 50. The primary electrical systems 50 are representative of the electrical systems that support the basic functions of the building 30. The primary electrical systems 50 may include, for instance, lighting systems, HVAC systems, wall sockets and the like.

The electrical systems of the building 30 may further include one or more charging stations 52. The charging stations 52 are each selectively coupleable between the electrical power distribution system 40 and an onboard rechargeable vehicle battery 60 of an electric vehicle 62. In the V2X system 20, the charging stations 52 are configured to support the bidirectional exchange of electrical power between the electrical power distribution system 40 and the batteries 60. Specifically, the charging stations 52 are operable to affect the supply of electrical power drawn from the grid 10 via the electrical power distribution system 40 to charge the batteries 60, as well as the discharge of electrical power from the batteries 60 for receipt by the electrical power distribution system 40. According to the illustrated V2X system 20 implemented with the building 30, the received electrical power discharged from the batteries 60 can supplement the electrical power drawn from the grid 10 to run the primary electrical systems 50 of the building 30. Alternatively, in a V2X system 20 implemented with the grid 10, for instance, the received electrical power discharged from the batteries 60 could be returned to the grid 10.

Each of the charging stations 52 may include a power inverter that is operable, for example, to convert AC electrical power drawn from the grid 10 to DC electrical power suitable for charging the batteries 60, and to convert DC electrical power discharged from the batteries 60 to AC electrical power suitable for running the primary electrical systems 50 of the building 30 or for return to the grid 10. In connection with this conversion, and as described below, the inverters may be operable to selectively adjust their gains to vary the amount of electrical power exchanged between the electrical power distribution system 40 and the batteries 60. The charging stations 52 may, as generally shown, be onsite charging stations 52 disposed within the building 30, for example. In other examples, one, some or all of the charging stations 52 may be onboard charging stations 52 disposed in whole or in part within the electric vehicles 62.

The charging stations 52 may further be operable to identify the states of charge and other aspects of the batteries 60. These aspects of the batteries 60 may be determined directly by the charging stations 52, for example, or may be identified from information passed from the batteries 60 or otherwise from the respective electric vehicles 62. As used herein, the state of charge of a given battery 60 reflects an amount of electrical energy stored by the battery 60, either in absolute terms or as a percentage of the electrical energy storage capacity of the battery 60. It will be understood that this amount of electrical energy need not be the total amount of electrical energy stored by the battery 60. Instead, for instance, the amount of electrical energy stored by the battery 60 could be an amount of electrical energy stored by the battery 60 and available for discharge as electrical power, for example, according to operational criteria specifying a minimum amount of electrical energy for the battery 60 to store.

The controller 48 of the electrical power distribution system 40 can be implemented in the form of a system that includes a processor that is operable to execute instructions that are stored on a computer readable storage device, such as RAM, ROM, a solid state memory device, or a disk drive. The controller 48 can further include a communications device for exchanging information with other devices over a communications network.

In the V2X system 20, the controller 48 is in communication with the charging stations 52, and subjects the charging stations 52 to its control in order to manage the exchange of electrical power between the electrical power distribution system 40 and the batteries 60. Below, these exchanges of electrical power, as well as the states of charge and other aspects of the batteries 60, are described collectively with reference to a battery bank 70 consisting of the batteries 60. Where the battery bank 70 includes more than one battery 60, it will be understood that the exchanged electrical power can be allocated in any manner among individual batteries 60 or groups of individual batteries 60. In one example, for instance, the exchanged electrical power can be allocated pro rata among individual batteries 60 or groups of individual batteries 60 on the basis of their respective states of charge.

Figure 2:
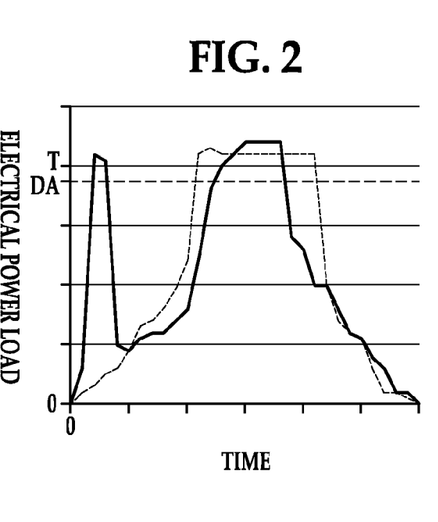
FIG. 2 includes a graph representing the building's electrical power load.

The building 30, in use, has an electrical power load. Two example electrical power loads for the building 30 over a given period of time are represented in FIG. 2. These electrical power loads generally represent the electrical power drawn by the primary electrical systems 50. In the absence of the V2X system 20, the electrical power consumption of the building 30 directly corresponds to these electrical power loads. Typically, the cost of this electrical power consumption is based not only on the aggregated total electrical energy consumption, but also on penalties invoked when the peak electrical power consumption for the building 30 exceeds certain targets, such as the example target T shown in FIG. 2.

With the V2X system 20, the electrical power consumption of the building 30 is a product of both the electrical power load and the electrical power exchanged between the battery bank 70 and the electrical power distribution system 40. Specifically, for a given power load, the battery bank 70 adds to the electrical power load and increases the electrical power consumption of the building 30 when electrical power is drawn from the grid 10 via the electrical power distribution system 40 and supplied to the battery bank 70 to charge the batteries 60, but offsets the electrical power load and decreases the electrical power consumption of the building 30 when electrical power is discharged from the battery bank 70 to supplement the electrical power drawn from the grid 10 to run the primary electrical systems 50.

In the V2X system 20, the monitor 46 measures the electrical power consumption of the building 30 from the grid 10, and the controller 48 is responsive to the monitor 46 to manage the exchange of electrical power between the electrical power distribution system 40 and the battery bank 70 in an effort to avoid the peak electrical power consumption for the building 30 exceeding the target T.

Figure 3:
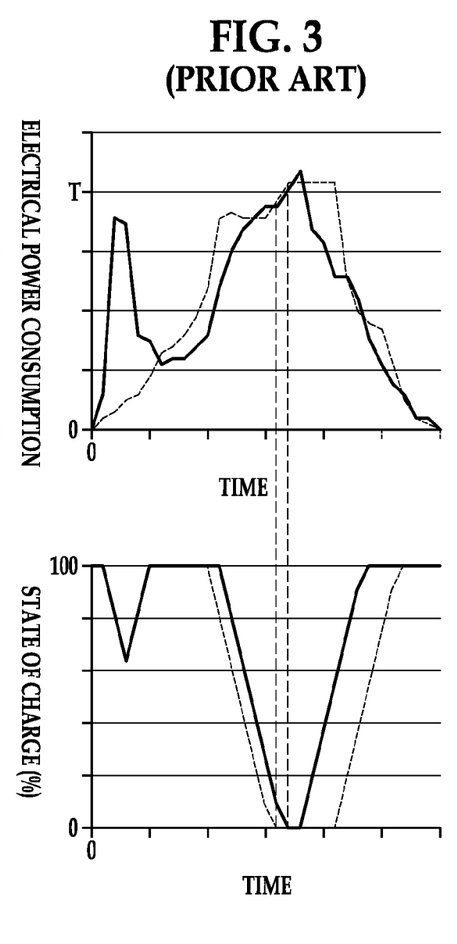
FIG. 3 includes graphs representing the building's electrical power consumption under the electrical power load represented in FIG. 2 and the battery bank's state of charge when the exchange of electrical power between the electrical power distribution system and the battery bank is managed in the V2X according to a known manner.

An example of managing the exchange of electrical power between the electrical power distribution system 40 and the battery bank 70 in the V2X system 20 according to a known manner is represented in FIG. 3. FIG. 3 represents the electrical power consumption of the building 30 as a product of the same two example electrical power loads for the building 30 represented in FIG. 2 and the electrical power exchanged between the battery bank 70 and the electrical power distribution system 40. FIG. 3 further represents the state of charge of the battery bank 70, which varies according to these exchanges of electrical power.

In the known manner of managing the exchange of electrical power between the electrical power distribution system 40 and the battery bank 70 in the V2X system 20, a discharge activation level DA is set at a certain level of electrical power consumption below the target T. When the electrical power consumption of the building 30 is below the discharge activation level DA, the controller 48 signals the charging stations 52 to supply electrical power drawn from the grid 10 via the electrical power distribution system 40 to the battery bank 70. As shown, this charges the battery bank 70 and increases the electrical power consumption of the building 30. On the other hand, when the electrical power consumption of the building 30 exceeds the discharge activation level DA, the controller 48 signals the charging stations 52 to discharge electrical power from the battery bank 70 for receipt by the electrical power distribution system 40. As shown, this decreases the electrical power consumption of the building 30 but decreases the state of charge of the battery bank 70.

In operation, discrete amounts of electrical power are exchanged between the electrical power distribution system 40 and the battery bank 70. These discrete amounts of electrical power correspond to the most electrical power that the electrical power distribution system 40, the charging stations 52, the batteries 60 of battery bank 70, the electric vehicles 62 and other involved equipment permit to be supplied to or discharged from the battery bank 70. The exchange of only discrete amounts of electrical power may be a product of, among other things, the operability of the inverters of the charging stations 52 to only support the exchange of discrete amounts of electrical power between the electrical power distribution system 40 and the batteries 60 according to set gains, for instance, in a generally ON/OFF manner.

Figure 4:
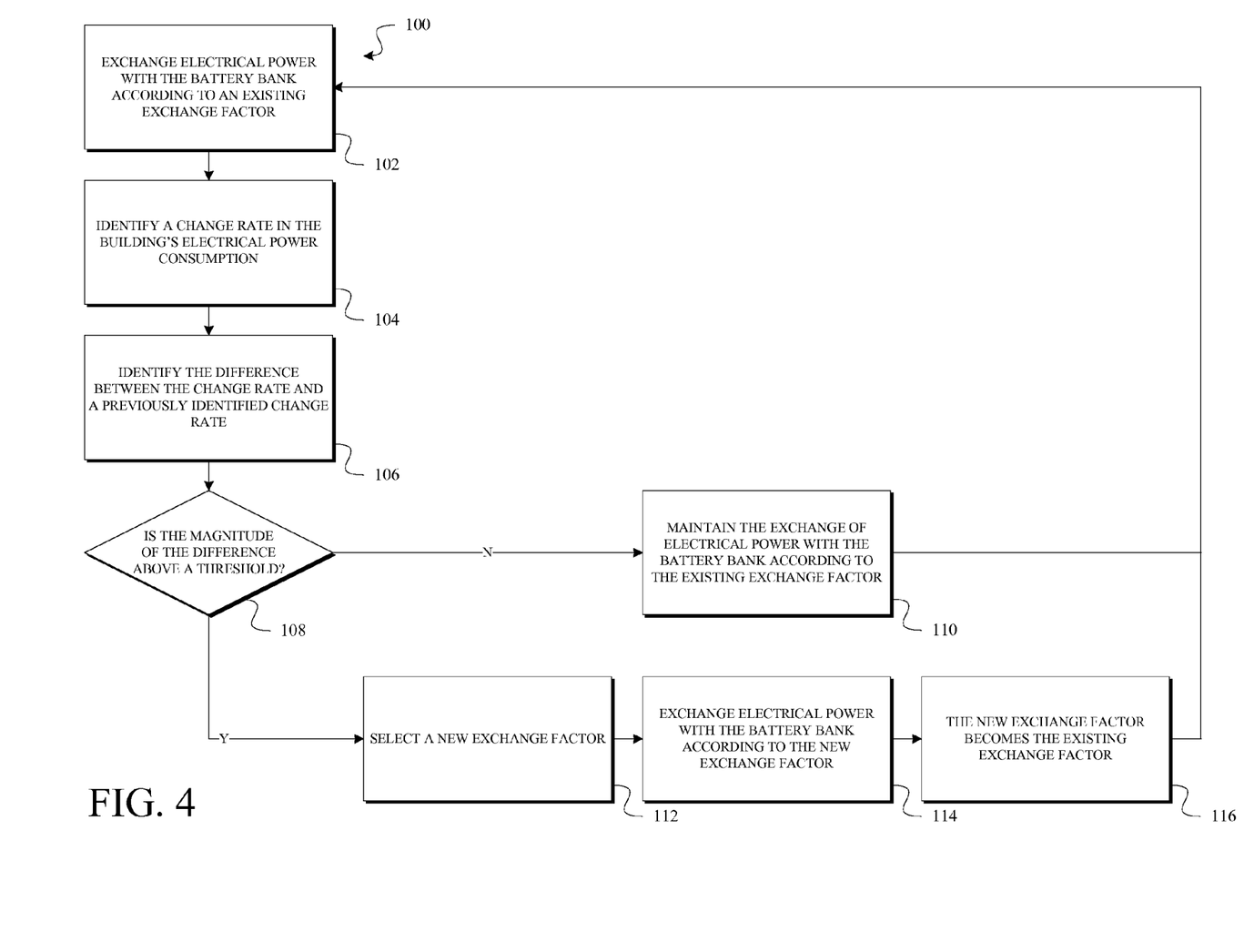
FIG. 4 is a flowchart showing operations for managing the exchange of electrical power between the electrical power distribution system and the battery bank in the V2X system according to an improved manner, including operations for identifying a change rate in the building's electrical power consumption, selecting a new exchange factor and exchanging electrical power with the battery bank according to the new exchange factor.

FIG. 4 shows example operations of a non-limiting example of a process 100 for managing the exchange of electrical power between the electrical power distribution system 40 and the battery bank 70 in the V2X system 20 according to an improved manner.

In the process 100, the management by the controller 48 of this exchange is informed by an exchange factor selected based on the conditions of the electrical power consumption of the building 30, the battery bank 70, or both. In an example implementation of the process 100 described below, the exchange factor is a value varying from negative 1.0 to positive 1.0, and in operation, is used by the controller 48 as a multiplier to select an amount of electrical power to exchange, from the perspective of the electrical power distribution system 40, between it and the battery bank 70. The controller 48 then signals the charging stations 52 to affect the exchange of the selected amount of electrical power based on the operability of their inverters to selectively adjust their gains to vary the amount of electrical power exchanged.

In the example implementation, the exchange factor, when negative, is multiplied by an amount of electrical power corresponding to the most electrical power that the electrical power distribution system 40, the charging stations 52, the batteries 60 of battery bank 70, the electric vehicles 62 and other involved equipment permit to be supplied to the battery bank 70. The result is a varying amount of electrical power to be drawn from the grid 10 via the electrical power distribution system 40 and supplied to the battery bank 70 that has a lower limit at or near zero electrical power and upper limit of the most electrical power permitted to be supplied to the battery bank 70.

Similarly, the exchange factor, when positive, is multiplied by an amount of electrical power corresponding to the most electrical power that the electrical power distribution system 40, the charging stations 52, the batteries 60 of battery bank 70, the electric vehicles 62 and other involved equipment permit to be discharged from the battery bank 70. The result is a varying amount of electrical power to be discharged from the battery bank 70 for receipt by the electrical power distribution system 40 that has a lower limit at or near zero electrical power and upper limit of the most electrical power permitted to be discharged from the battery bank 70.

According to the example implementation, the exchange factor may therefore dictate, for instance, whether to supply electrical power to the battery bank 70 or discharge electrical power from the battery bank 70. Additionally, the exchange factor may dictate, for instance, varying amounts of electrical power to be exchanged between the electrical power distribution system 40 and the battery bank 70. In other example implementations, it will be understood that whether to supply electrical power to the battery bank 70 or discharge electrical power from the battery bank 70, the varying amounts of electrical power to be exchanged between the electrical power distribution system 40 and the battery bank 70, or both, may be more directly selected by the controller 48.

In step 102, the controller 48 signals the charging stations 52 to exchange electrical power between the electrical power distribution system 40 and the battery bank 70 according to an existing exchange factor selected in a previous iteration of the process 100.

In step 104, the monitor 46 measures the electrical power consumption of the building 30 from the grid 10 at least at a first time and at a subsequent second time, and a change rate in the electrical power consumption of the building 30 from the first time to the second time is identified. In step 106, the difference between the change rate and a previously identified change rate is identified. This difference, if any, will reflect any acceleration or deceleration in the electrical power consumption of the building 30 from the grid 10.

In step 108, the magnitude of the difference between the change rate and the previously identified change rate is compared to a threshold. If the magnitude of the difference is below the threshold, in step 110, the controller 48 signals the charging stations 52 to maintain the exchange of electrical power between the electrical power distribution system 40 and the battery bank 70 according to the existing exchange factor, and the process 100 returns to step 102.

If, on the other hand, the magnitude of the difference is above the threshold, in step 112, a new exchange factor is selected, and in step 114, the controller 48 signals the charging stations 52 to exchange electrical power between the electrical power distribution system 40 and the battery bank 70 according to the new exchange factor. In step 116, the new exchange factor becomes the existing exchange factor and the process 100 returns to step 102.

Figure 5:
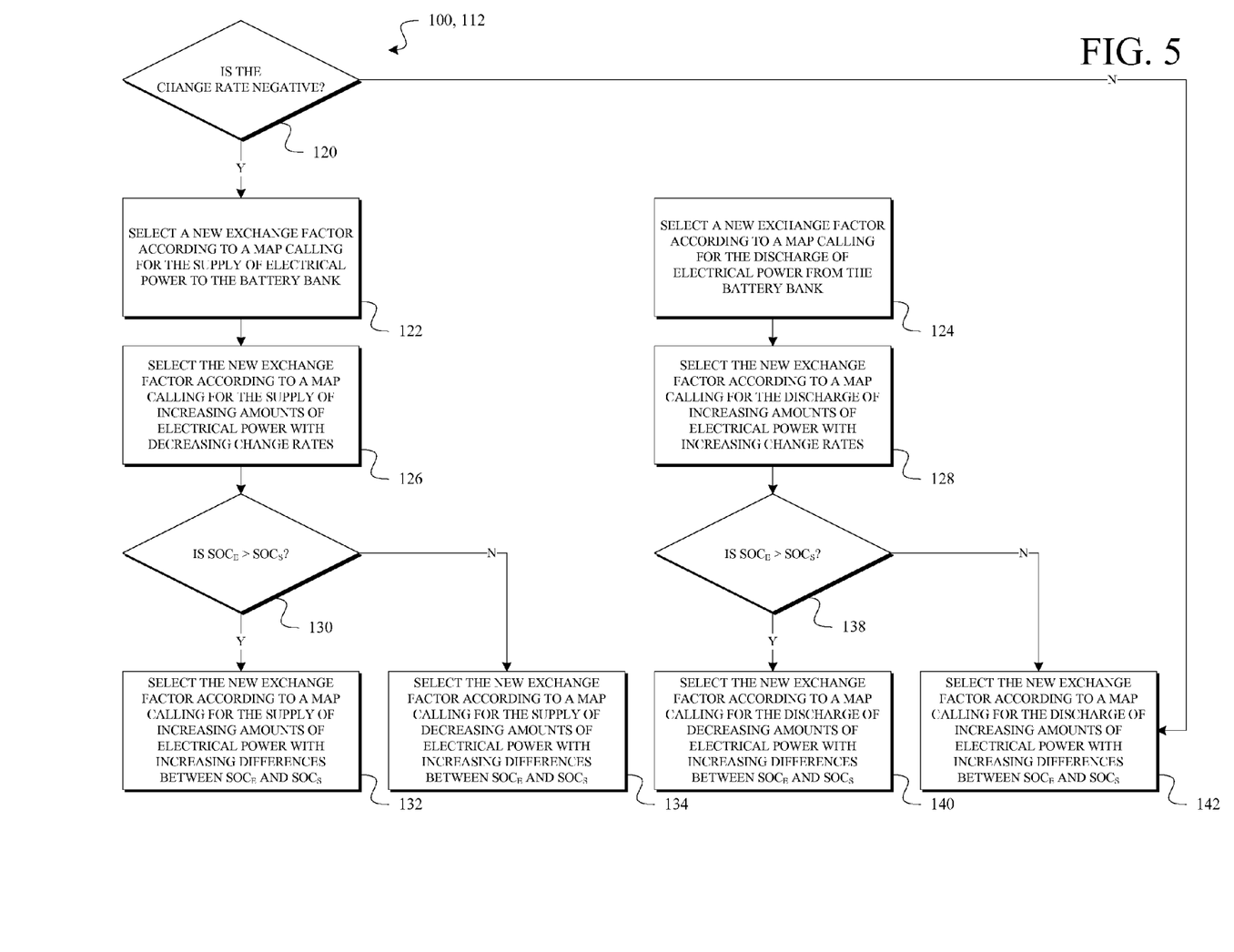
FIG. 5 is a flowchart showing operations for selecting the new exchange factor based on the change rate and differences between the battery bank's desired ending state of charge and the battery bank's starting state of charge.
Figure 6:
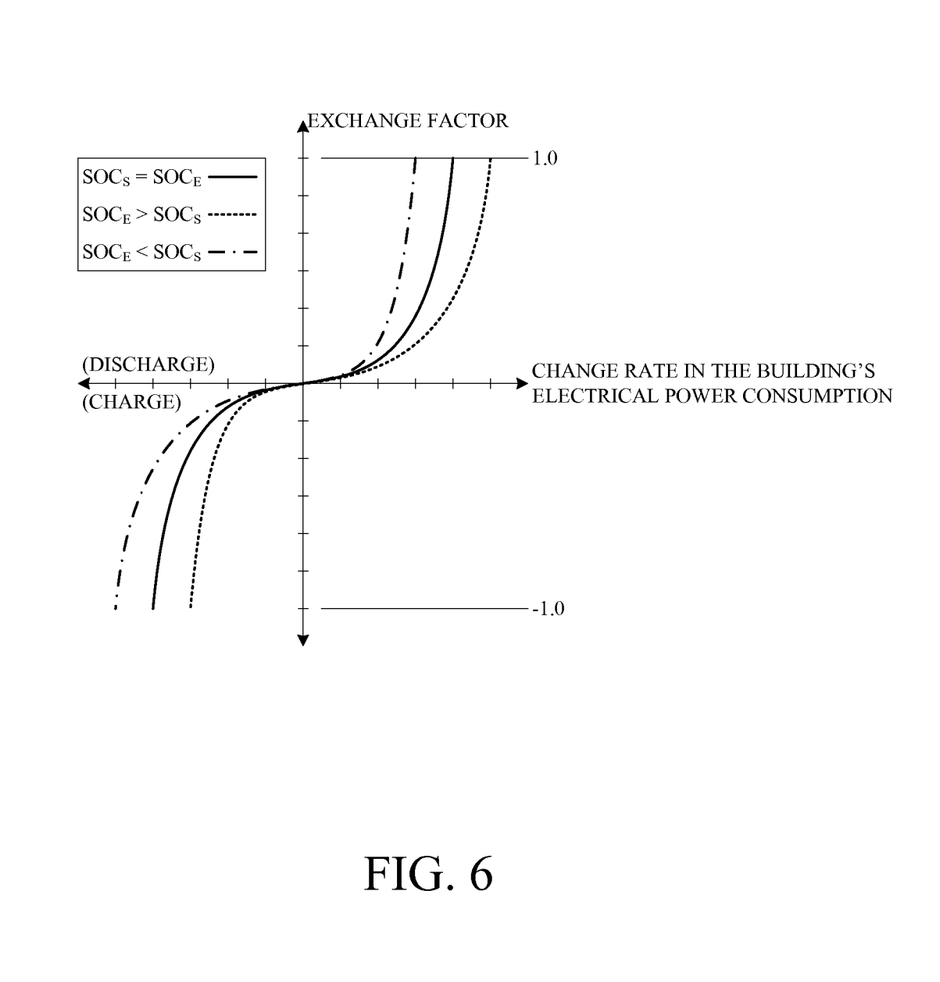
FIG. 6 is a graph representing an example map that includes different exchange factors as a function of the change rate and differences between the battery bank's desired ending state of charge and the battery bank's starting state of charge.

FIG. 5 shows example operations for the selection of the new exchange factor in step 112. As described below, according to these operations, the new exchange factor is selected based on the change rate, and optionally, further based on differences between a desired ending state of charge $SOC_E$ for the battery bank 70 and a starting state of charge $SOC_S$ for the battery bank 70. A non-limiting example of a map including different exchange factors according to these operations is represented in FIG. 6.

In step 120, the change rate in the electrical power consumption of the building 30 from the grid 10 is identified as being negative or positive. A negative change rate reflects that the electrical power consumption of the building 30 from the grid 10 is decreasing, while a positive change rate reflects that the electrical power consumption of the building 30 from the grid 10 is increasing. If the change rate is negative, in step 122, a new, negative, exchange factor is selected that calls for electrical power to be drawn from the grid 10 via the electrical power distribution system 40 and supplied to the battery bank 70. If the change rate is positive, in step 124, a new, positive, exchange factor is selected that calls for electrical power to be discharged from the battery bank 70 for receipt by the electrical power distribution system 40.

In connection with step 122, in step 126, the new, negative, exchange factor calling for electrical power to be drawn from the grid 10 via the electrical power distribution system 40 and supplied to the battery bank 70 may be selected, based on the change rate, to call for the amount of electrical power to be supplied to the battery bank 70. Decreasing (i.e., increasingly negative) change rates reflect faster decreases in the electrical power consumption of the building 30 from the grid 10. In step 126, the new exchange factor is selected to call for the supply of increasing amounts of electrical power to the battery bank 70 with decreasing change rates, with the corollary being that the new exchange factor is selected to call for the supply of decreasing amounts of electrical power to the battery bank 70 with increasing (i.e., decreasingly negative) change rates.

In connection with step 124, in step 128, the new, positive, exchange factor calling for electrical power to be discharged from the battery bank 70 for receipt by the electrical power distribution system 40 may be selected, based on the change rate, to call for the amount of electrical power to be discharged from the battery bank 70. Increasingly positive change rates reflect faster increases in the electrical power consumption of the building 30 from the grid 10. In step 128, the new exchange factor is selected to call for the discharge of increasing amounts of electrical power from the battery bank 70 with increasing change rates, with the corollary being that the new exchange factor is selected to call for the discharge of decreasing amounts of electrical power to the battery bank 70 with decreasing change rates.

The map shown in FIG. 6, for instance, may be used to select the new exchange factor consonant with the above described operations. As shown, the map includes different exchange factors as a function of the change rate.

For negative change rates, the included exchange factors are negative values ranging from negative 1.0 towards zero. Moreover, these exchange factors become increasingly negative with decreasing change rates. In the above described example implementation of the process 100, these negative exchange factors are used by the controller 48 as a multiplier for the most electrical power permitted to be supplied to the battery bank 70 in order to select an amount of electrical power to exchange with the battery bank 70. This results, first, in the selected amount of electrical power being negative from the perspective of the electrical power distribution system 40, meaning that the controller 48 will signal for the supply of the selected amount of electrical power to the battery bank 70, and second, in the selected amount of electrical power increasing with decreasing change rates, from a lower limit at or near zero electrical power to upper limit of the most electrical power permitted to be supplied to the battery bank 70.

For positive change rates, the included exchange factors are positive values ranging from zero towards positive 1.0. Moreover, these exchange factors become increasingly positive with increasing change rates. Once again, in the above described example implementation of the process 100, these positive exchange factors are used by the controller 48 as a multiplier for the most electrical power permitted to be discharged from the battery bank 70 in order to select an amount of electrical power to exchange with the battery bank 70. This results, first, in the selected amount of electrical power being positive from the perspective of the electrical power distribution system 40, meaning that the controller 48 will signal for the discharge of the selected amount of electrical power from battery bank 70, and second, in the selected amount of electrical power increasing with increasing change rates, from a lower limit at or near zero electrical power to upper limit of the most electrical power permitted to be discharged from the battery bank 70.

Figure 7:
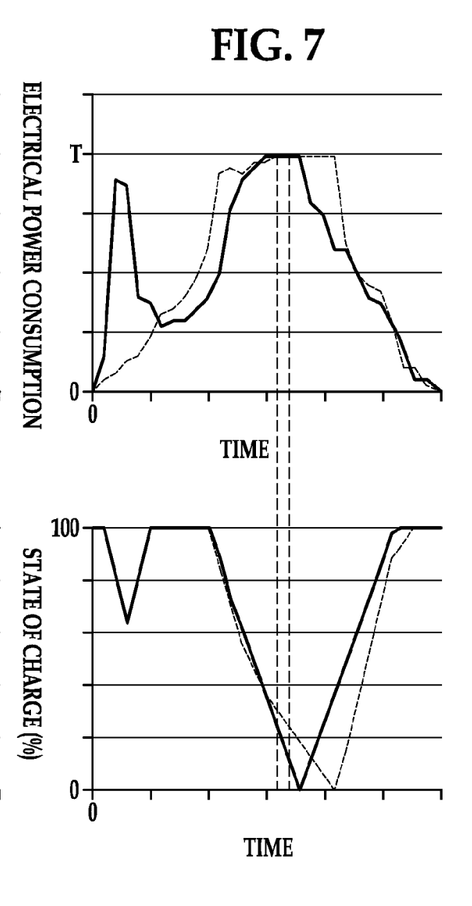
FIGS. 7-9 include graphs representing the building's electrical power consumption under the electrical power load represented in FIG. 2 and the battery bank's state of charge when the exchange of electrical power between the electrical power distribution system and the battery bank is managed in the V2X system according to the improved manner.

FIG. 7 represents the management of the exchange of electrical power between the electrical power distribution system 40 and the battery bank 70 in the V2X system 20 according to the forgoing operations of the process 100. FIG. 7 represents the electrical power consumption of the building 30 as a product of the same two example electrical power loads for the building 30 represented in FIG. 2 and the electrical power exchanged between the battery bank 70 and the electrical power distribution system 40, as well as the state of charge of the battery bank 70, which varies according to these exchanges of electrical power.

As shown, compared to the management of the exchange of electrical power between the electrical power distribution system 40 and the battery bank 70 in the V2X system 20 represented in FIG. 3, the management of this exchange according to the process 100 results in more effective avoidance of the peak electrical power consumption for the building 30 exceeding the target T.

FIG. 3, for instance, reflects the controller 48 signaling for the charging stations 52 to discharge electrical power from the battery bank 70 for receipt by the electrical power distribution system 40 when the electrical power consumption of the building 30 exceeds the discharge activation level DA, even when the electrical power consumption of the building 30 is relatively constant, or even decreasing, below the target T. This, may, for instance as shown, cause the unnecessary depletion of the state of charge of the battery bank 70 to zero percent. Consequently, as the electrical power consumption of the building 30 subsequently increases, the target T is exceeded notwithstanding the V2X system 20 because the battery bank 70 is no longer able to discharge electrical power to offset the electrical power load.

In contrast, the electrical power consumption of the building 30 in the future is forecast according to the process 100, reducing both unnecessary depletion of the state of charge of the battery bank 70 and inopportune supply of electrical power to the battery bank 70.

FIG. 7, for instance, reflects the controller 48 signaling for the charging stations 52 to discharge decreasing amounts of electrical power from the battery bank 70 for receipt by the electrical power distribution system 40 as the electrical power consumption of the building 30 levels out towards a relatively constant amount. This, as shown, slows the depletion of the state of charge of the battery bank 70, even, for example, when the electrical power consumption of the building 30 would otherwise exceed the activation level DA. Consequently, as the electrical power consumption of the building 30 subsequently increases, the target T is not exceeded because the battery bank 70 is able to discharge the necessary electrical power to offset the electrical power load.

Similarly, it will be understood that the controller 48 according to the process 100 may signal for the charging stations 52 to draw electrical power from the grid 10 via the electrical power distribution system 40 for supply to the battery bank 70 if the electrical power consumption of the building 30 is decreasing, even, for example, when the electrical power consumption of the building 30 would otherwise exceed the activation level DA, in anticipation that the electrical power consumption of the building 30 will continue to decrease and make subsequent discharge of electrical power from the battery bank 70 unnecessary.

With reference again to FIG. 5, in connection with step 122, in steps 130-132, the new, negative, exchange factor calling for electrical power to be drawn from the grid 10 via the electrical power distribution system 40 and supplied to the battery bank 70 may be selected to call for the amount of electrical power to be supplied to the battery bank 70 further based on differences between a desired ending state of charge $SOC_E$ and a starting state of charge $SOC_S$ for the battery bank 70.

In step 130, the desired ending state of charge $SOC_E$ is compared to the starting state of charge $SOC_S$. When the desired ending state of charge $SOC_E$ is larger than the starting state of charge $SOC_S$, increasing differences between the desired ending state of charge $SOC_E$ and the starting state of charge $SOC_S$ reflect the need for increasing amounts of electrical power to be supplied to the battery bank 70. If the desired ending state of charge $SOC_E$ is larger than the starting state of charge $SOC_S$, in step 132, the new exchange factor is selected to call for the supply of increasing amounts of electrical power to the battery bank 70 with increasing differences between the desired ending state of charge $SOC_E$ and the starting state of charge $SOC_S$, with the corollary being that the new exchange factor is selected to call for the supply of decreasing amounts of electrical power to the battery bank 70 with decreasing differences between the desired ending state of charge $SOC_E$ and the starting state of charge $SOC_S$.

On the other hand, when the desired ending state of charge $SOC_E$ is less than the starting state of charge $SOC_S$, increasing differences between the desired ending state of charge $SOC_E$ and the starting state of charge $SOC_S$ reflect the need for decreasing amounts of electrical power to be supplied to the battery bank 70. If the desired ending state of charge $SOC_E$ is less than the starting state of charge $SOC_S$, in step 134, the new exchange factor is selected to call for the supply of decreasing amounts of electrical power to the battery bank 70 with increasing differences between the desired ending state of charge $SOC_E$ and the starting state of charge $SOC_S$, with the corollary being that the new exchange factor is selected to call for the supply of increasing amounts of electrical power to the battery bank 70 with decreasing differences between the desired ending state of charge $SOC_E$ and the starting state of charge $SOC_S$.

Similarly, in connection with step 124, in steps 138-142, the new, positive, exchange factor calling for electrical power to be discharged from the battery bank 70 for receipt by the electrical power distribution system 40 may be selected to call for the amount of electrical power to be discharged from the battery bank 70 further based on differences between the desired ending state of charge $SOC_E$ and the starting state of charge $SOC_S$ for the battery bank 70.

In step 138, the desired ending state of charge $SOC_E$ is compared to the starting state of charge $SOC_S$. When the desired ending state of charge $SOC_E$ is larger than the starting state of charge $SOC_S$, increasing differences between the desired ending state of charge $SOC_E$ and the starting state of charge $SOC_S$ reflect the need to discharge decreasing amounts of electrical power from the battery bank 70. If the desired ending state of charge $SOC_E$ is larger than the starting state of charge $SOC_S$, in step 140, the new exchange factor is selected to call for the discharge of decreasing amounts of electrical power to the battery bank 70 with increasing differences between the desired ending state of charge $SOC_E$ and the starting state of charge $SOC_S$, with the corollary being that the new exchange factor is selected to call for the discharge of increasing amounts of electrical power to the battery bank 70 with decreasing differences between the desired ending state of charge $SOC_E$ and the starting state of charge $SOC_S$.

On the other hand, when the desired ending state of charge $SOC_E$ is less than the starting state of charge $SOC_S$, increasing differences between the desired ending state of charge $SOC_E$ and the starting state of charge $SOC_S$ reflect an opportunity to discharge increasing amounts of electrical power from the battery bank 70. If the desired ending state of charge $SOC_E$ is less than the starting state of charge $SOC_S$, in step 142, the new exchange factor is selected to call for the discharge of decreasing amounts of electrical power from the battery bank 70 with increasing differences between the desired ending state of charge $SOC_E$ and the starting state of charge $SOC_S$, with the corollary being that the new exchange factor is selected to call for the discharge of increasing amounts of electrical power from the battery bank 70 with decreasing differences between the desired ending state of charge $SOC_E$ and the starting state of charge $SOC_S$.

Once again, the map shown in FIG. 6 may be used to select the new exchange factor consonant with the above described operations.

As described above, for negative change rates, the exchange factors are negative values ranging from negative 1.0 towards zero. As compared to a baseline where the desired ending state of charge $SOC_E$ is equal to the starting state of charge $SOC_S$, if the ending state of charge $SOC_E$ is larger than the starting state of charge $SOC_S$, these exchange factors become increasingly negative faster with decreasing change rates, while if the ending state of charge $SOC_E$ is less than the starting state of charge $SOC_S$, these exchange factors become increasingly negative slower with decreasing change rates.

In the above described example implementation of the process 100, these negative exchange factors are used by the controller 48 as a multiplier for the most electrical power permitted to be supplied to the battery bank 70 in order to select an amount of electrical power to exchange with the battery bank 70. If the state of charge $SOC_E$ is larger than the starting state of charge $SOC_S$, this results in the selected amount of electrical power increasing faster with decreasing change rates from a lower limit at or near zero electrical power to upper limit of the most electrical power permitted to be supplied to the battery bank 70. If, however, the state of charge $SOC_E$ is less than the starting state of charge $SOC_S$, this results in the selected amount of electrical power increasing slower with decreasing change rates from the lower limit to the upper limit.

As described above, for positive change rates, the included exchange factors are positive values ranging from zero towards positive 1.0. As compared to a baseline where the desired ending state of charge $SOC_E$ is equal to the starting state of charge $SOC_S$, if the ending state of charge $SOC_E$ is larger than the starting state of charge $SOC_S$, these exchange factors become increasingly positive slower with increasing change rates, while if the ending state of charge $SOC_E$ is less than the starting state of charge $SOC_S$, these exchange factors become increasingly positive faster with increasing change rates.

Once again, in the above described example implementation of the process 100, these positive exchange factors are used by the controller 48 as a multiplier for the most electrical power permitted to be discharged from the battery bank 70 in order to select an amount of electrical power to exchange with the battery bank 70. If the state of charge $SOC_E$ is larger than the starting state of charge $SOC_S$, this results in the selected amount of electrical power increasing slower with increasing change rates from a lower limit at or near zero electrical power to upper limit of the most electrical power permitted to be discharged from the battery bank 70. If, however, the state of charge $SOC_E$ is less than the starting state of charge $SOC_S$, this results in the selected amount of electrical power increasing faster with increasing change rates from the lower limit to the upper limit.

Figure 8:
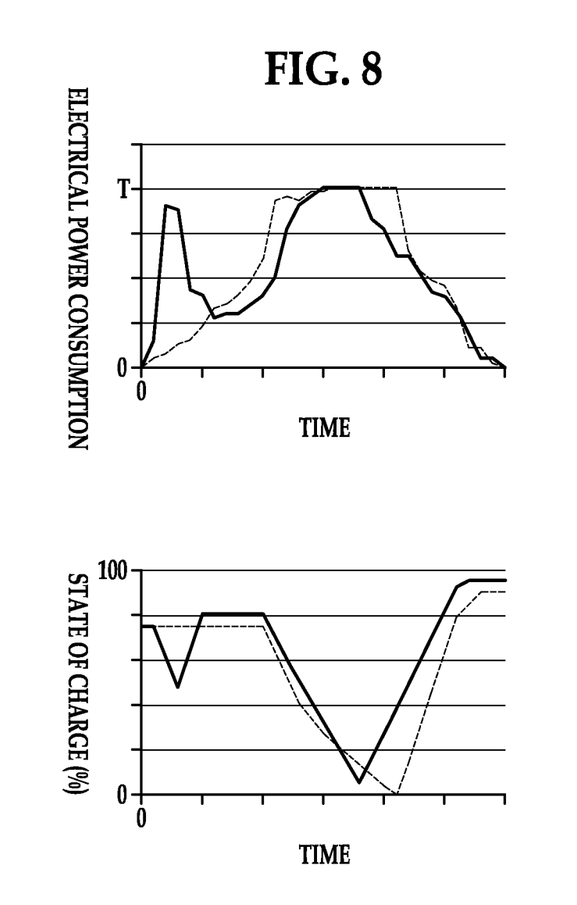
Figure 9:
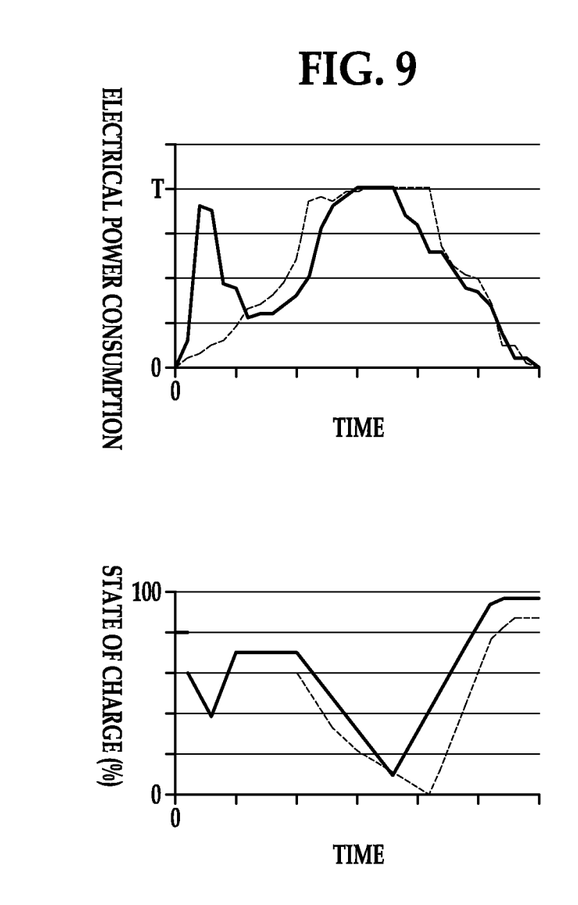

FIGS. 8 and 9 represent the management of the exchange of electrical power between the electrical power distribution system 40 and the battery bank 70 in the V2X system 20 according to the foregoing operations of the process 100, including operations 130-142 in combination with operations 120-128. FIGS. 8 and 9 once again represent the electrical power consumption of the building 30 as a product of the same two example electrical power loads for the building 30 represented in FIG. 2 and the electrical power exchanged between the battery bank 70 and the electrical power distribution system 40, as well as the state of charge of the battery bank 70, which varies according to these exchanges of electrical power.

As shown in FIGS. 8 and 9, the management of the exchange of electrical power between the electrical power distribution system 40 and the battery bank 70 according to the process 100 once again results in more effective avoidance of the peak electrical power consumption for the building 30 exceeding the target T. Moreover, as shown, this management may further assist in maintaining the typical driver's expectation for the charging stations 52 to return an electric vehicle 62 with its vehicle battery 60 at a higher state of charge than when it was parked by supplying relatively higher amounts of electrical power to the battery bank 70 and discharging relatively lower amounts of electrical power from the battery bank 70 when the desired ending state of charge $SOC_E$ is larger than the starting state of charge $SOC_S$, as well as exploit opportunities to supply relatively lower amounts of electrical power to the battery bank 70 and discharge relatively higher amounts of electrical power from the battery bank 70 when the desired ending state of charge $SOC_E$ is less than the starting state of charge $SOC_S$.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A V2X system, comprising:
an electrical power distribution system configured to draw electrical power from a grid, support the supply of the drawn electrical power to one or more primary electrical systems and support the exchange of electrical power with a battery bank including at least one rechargeable vehicle battery; and
an electrical power distribution system controller for managing the exchange of electrical power between the electrical power distribution system and the battery bank, the controller configured to:
identify a change rate in electrical power drawn by the electrical power distribution system from the grid,
determine a difference between the change rate and a previously identified change rate,
if the magnitude of the difference is below a threshold, signal for the exchange of a previously selected amount of electrical power, and
if the magnitude of the difference is above the threshold, request a selection of an amount of electrical power,
select the amount of electrical power for the electrical power distribution system to exchange with the battery bank based on the change rate, and
signal for the exchange of the selected amount of electrical power.

2. The V2X system of claim 1, wherein if the electrical power drawn by the electrical power distribution system from the grid is increasing, the amount of electrical power is selected for discharge from the battery bank, and the controller is further configured to:
signal for the discharge of the selected amount of electrical power from the battery bank to the electrical power distribution system.

3. The V2X system of claim 2, wherein the selected amount of electrical power increases with increasing change rates.

4. The V2X system of claim 1, wherein if the electrical power drawn by the electrical power distribution system from the grid is decreasing, the amount of electrical power is selected for supply to the battery bank, and the controller is further configured to:
  signal for the supply of the selected amount of electrical power to the battery bank from the grid via the electrical power distribution system.

5. The V2X system of claim 4, wherein the selected amount of electrical power increases with decreasing change rates.

6. The V2X system of claim 1, wherein the controller is further configured to:
  select the amount of electrical power from a map representing different amounts of electrical power as a function of the change rate.

7. A method for managing the exchange of electrical power with a battery bank in a V2X system, comprising:
  in an electrical power distribution system configured to draw electrical power from a grid, support the supply of the drawn electrical power to one or more primary electrical systems and support the exchange of electrical power with a battery bank including at least one rechargeable vehicle battery:
    identifying a change rate in electrical power drawn by the electrical power distribution system from the grid,
    determining a difference between the change rate and a previously identified change rate,
    if the magnitude of the difference is below a threshold, signaling for the exchange of a previously selected amount of electrical power, and
    if the magnitude of the difference is above the threshold, requesting a new selection of an amount of electrical power,
    selecting the amount of electrical power for the electrical power distribution system to exchange with the battery bank based on the change rate, and
    signaling for the exchange of the selected amount of electrical power.

8. The method of claim 7, wherein if the electrical power drawn by the electrical power distribution system from the grid is increasing, the amount of electrical power is selected for discharge from the battery bank, further comprising:
  signaling for the discharge of the selected amount of electrical power from the battery bank to the electrical power distribution system.

9. The method of claim 8, wherein the selected amount of electrical power increases with increasing change rates.

10. The method of claim 7, wherein if the electrical power drawn by the electrical power distribution system from the grid is decreasing, the amount of electrical power is selected for supply to the battery bank, further comprising:
  signaling for the supply of the selected amount of electrical power to the battery bank from the grid via the electrical power distribution system.

11. The method of claim 10, wherein the selected amount of electrical power increases with decreasing change rates.

12. The method of claim 7, further comprising:
  selecting the amount of electrical power from a map representing different amounts of electrical power as a function of the change rate.

13. A V2X system, comprising:
  an electrical power distribution system configured to draw electrical power from a grid, support the supply of the drawn electrical power to one or more primary electrical systems and support the exchange of electrical power with a battery bank including at least one rechargeable vehicle battery; and
  an electrical power distribution system controller for managing the exchange of electrical power between the electrical power distribution system and the battery bank, the controller configured to:
    identify a change rate in electrical power drawn by the electrical power distribution system from the grid,
    determine a difference between the change rate and a previously identified change rate,
    if the magnitude of the difference is below a threshold, signal for the exchange of a previously selected amount of electrical power, and
    if the magnitude of the difference is above the threshold, request a selection of an amount of electrical power,
    select the amount of electrical power for the electrical power distribution system to exchange with the battery bank based on the change rate,
    if the electrical power drawn by the electrical power distribution system from the grid is increasing, signal for the discharge of the selected amount of electrical power from the battery bank to the electrical power distribution system, and
    if the electrical power drawn by the electrical power distribution system from the grid is decreasing, signal for the supply of selected amount of electrical power to the battery bank from the grid via the electrical power distribution system.

14. The V2X system of claim 13, wherein the selected amount of electrical power increases with increasing change rates.

15. The V2X system of claim 13, wherein the selected amount of electrical power increases with decreasing change rates.

16. The V2X system of claim 13, wherein the
  selects the amount of electrical power for the battery to discharge or to supply to the battery bank from a map representing different amounts of electrical power as a function of the change rate.

* * * * *